UNITED STATES PATENT OFFICE.

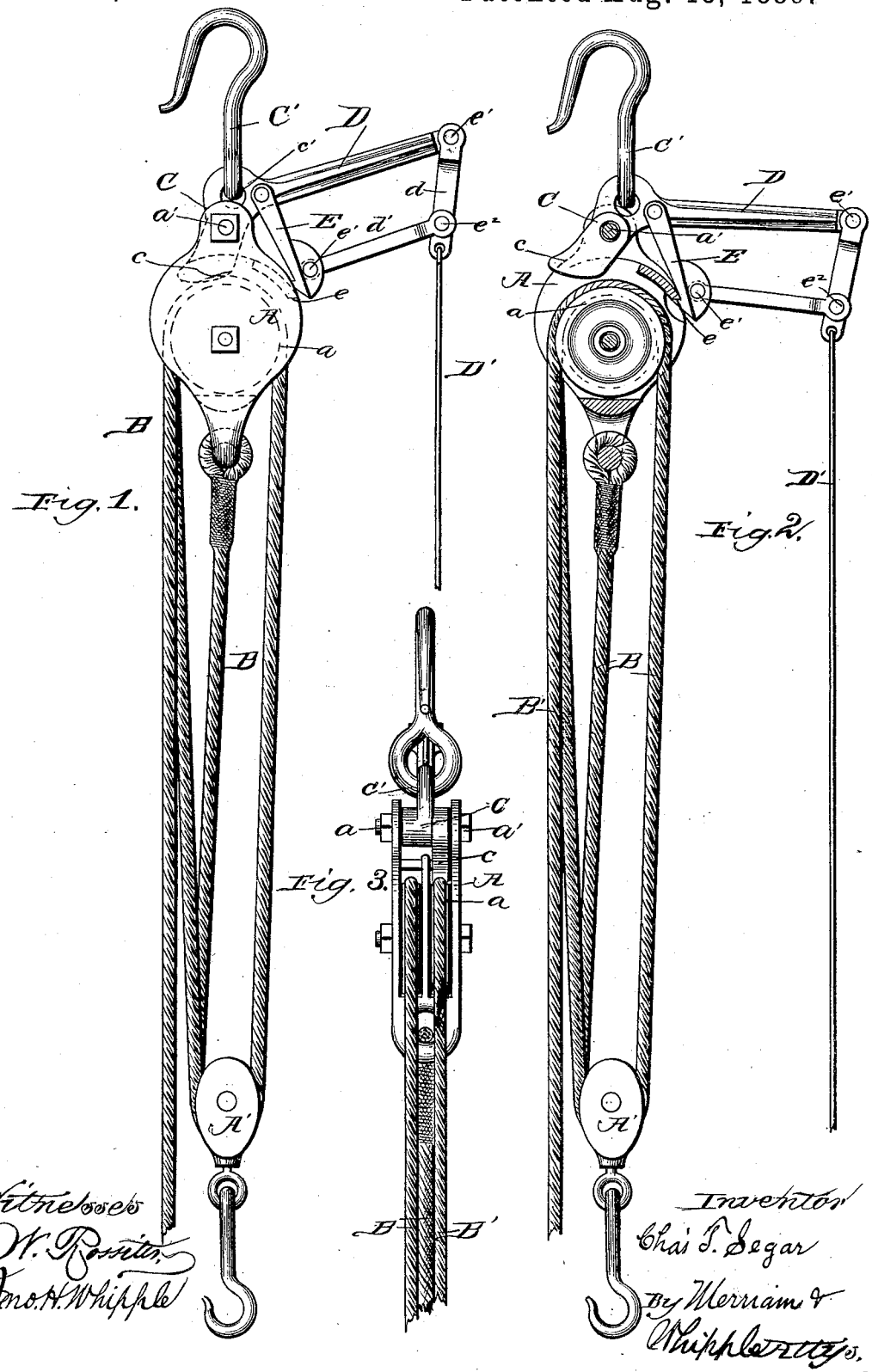

CHARLES T. SEGAR, OF UTICA, NEW YORK.

PULLEY-BLOCK.

SPECIFICATION forming part of Letters Patent No. 408,814, dated August 13, 1889.

Application filed May 28, 1889. Serial No. 312,444. (No model.)

*To all whom it may concern:*

Be it known that I, CHARLES T. SEGAR, of Utica, in the State of New York, have invented certain new and useful Improvements in Pulley-Blocks, of which the following is a specification.

My invention relates to self-locking pulley-blocks; and the objects of my improvements are, first, to provide a cam in conjunction with the hook or attaching device for connecting the block with the support which sustains the weight or body to be raised, such attaching device and cam being pivotally connected with the block and placed obliquely to the line of pull, so that the weight suspended upon the attaching device will cause the cam to bear upon the pulley or the rope thereon on the outgoing side with sufficient force to suspend the weight or body being raised when the operator lets go of the rope, and, second, to provide means for releasing the cam and means for locking it out of contact. These objects I have attained by the construction illustrated in the accompanying drawings, in which—

Figure 1 is a side elevation of a tackle containing my invention. Fig. 2 is a central section representing the same with the cam locked out of contact. Fig. 3 is an edge view representing the apparatus as viewed from the left and at right angles to the face of the side as represented in Fig. 1.

In the drawings, A A' designate pulley-blocks provided with pulleys $a$, of ordinary construction and arrangement, so that a rope B may be run through the blocks over the pulleys in the usual manner. Through the shell of the block A, at the upper edge, there is passed a bolt $a'$, and upon this bolt a cam-piece C is pivoted. The cam $c$ is attached to one side of this piece, and extends down toward the rope, where it passes over the pulley $a$, so that when turned toward the rope it will come in contact therewith and bear upon the free portion B as it passes out over the pulley when the rope is pulled in the direction required to raise the weight.

The hook C' or attaching device is connected to the opposite end or side of the cam-piece at $c'$, so that a line through said point, the pivot $a'$, and the cam would be slightly oblique to the line of pull of the tackle, or a line through the centers of the blocks A A'. By this arrangement the weight of the body to be raised will incline the cam upon the rope opposite the pulley on the outgoing side with sufficient force or contact to cause it to bind the rope between the cam and pulley and prevent backward movement thereof. The force of the cam upon the rope will be proportionate to the weight of the body to be raised.

By means of an arm or lever D attached to the cam-piece the cam can be held off the rope by means of a cord D', for pulling down on the outer end of said arm; and by means of a pawl E, pivoted to the cam-piece opposite to the cam and adapted to engage a notch or projecting point $e$ on the shell of the block, the cam may be set and held off the rope, so that the pulley-block can be used as an ordinary one not having a self-locking cam.

I provide a link-connection composed of links $d$ $d'$, between the free ends of the arm D and the pawl E, pivoted thereto at $e'$ $e'$ and to one another at $e^2$, whereby any or all of the operations of holding the cam off the rope or engaging the pawl with the projection or point $e$ or releasing the same therefrom may be accomplished by pulling on the cord D'. A slight pull of said cord will raise the cam off the rope without setting the pawl, a stronger pull will set the pawl, and when set a pull sufficient to disengage it and a quick release of the cord will throw the pawl over the point $e$ and permit it to rest and slide on the shell of the block above said point.

Having thus described my invention, what I claim, and desire to secure by Letters Patent, is—

1. A pulley-block in combination with a cam-piece pivotally connected to such block and having a cam on one side of such connection and an attaching device on the other placed obliquely to the line of pull, and a pawl pivoted to said cam-piece opposite to the cam and adapted to engage a projection on said block, as and for the purpose specified.

2. A pulley-block in combination with a cam-piece pivoted to said block and having a cam and an attaching device arranged as shown and described, and an arm and pawl opposite to said cam, the free ends of said arm and pawl being connected by links pivoted thereto, substantially as and for the purpose specified.

C. T. SEGAR.

Witnesses:
W. L. DEXTER,
H. H. TARBELL.